(12) United States Patent
Watanabe et al.

(10) Patent No.: US 8,594,716 B2
(45) Date of Patent: *Nov. 26, 2013

(54) POWER CONTROL APPARATUS FOR WIRELESS TELECOMMUNICATION SYSTEM

(75) Inventors: Teruyoshi Watanabe, Kawasaki (JP); Hajime Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 501 days.

This patent is subject to a terminal disclaimer.

(21) Appl. No.: 11/433,985

(22) Filed: May 15, 2006

(65) Prior Publication Data

US 2007/0197253 A1 Aug. 23, 2007

(30) Foreign Application Priority Data

Feb. 21, 2006 (JP) ................................ 2006-044429

(51) Int. Cl.
*H04B 7/00* (2006.01)
*H04B 17/00* (2006.01)
*H04B 7/216* (2006.01)

(52) U.S. Cl.
USPC ........ 455/522; 455/67.11; 370/318; 370/320; 370/335

(58) Field of Classification Search
USPC .................. 455/522, 67.11, 69, 13.4, 12.1; 370/318, 320, 335
See application file for complete search history.

(56) References Cited

U.S. PATENT DOCUMENTS

| | | | |
|---|---|---|---|
| 5,822,318 A | 10/1998 | Tiedemann, Jr. et al. | |
| 7,110,786 B2 * | 9/2006 | Moulsley et al. | 455/522 |
| 7,218,949 B2 * | 5/2007 | Koo et al. | 455/522 |
| 7,324,782 B1 * | 1/2008 | Rudrapatna | 455/25 |
| 7,593,486 B2 * | 9/2009 | Jeong et al. | 375/324 |
| 7,616,677 B2 * | 11/2009 | Koo et al. | 375/141 |
| 2002/0028691 A1 | 3/2002 | Moulsley et al. | |
| 2002/0058524 A1 * | 5/2002 | Arimitsu | 455/522 |
| 2002/0061764 A1 | 5/2002 | Kim et al. | |
| 2002/0187802 A1 * | 12/2002 | Agin et al. | 455/522 |
| 2003/0092463 A1 * | 5/2003 | Charriere et al. | 455/522 |
| 2003/0174675 A1 | 9/2003 | Willenegger et al. | |
| 2003/0174676 A1 | 9/2003 | Willenegger et al. | |
| 2003/0174686 A1 | 9/2003 | Willenegger et al. | |
| 2004/0043783 A1 * | 3/2004 | Anderson | 455/522 |
| 2004/0082301 A1 * | 4/2004 | Agin | 455/127.1 |

(Continued)

FOREIGN PATENT DOCUMENTS

| | | |
|---|---|---|
| CN | 1419346 | 5/2003 |
| JP | 2002-198903 | 7/2002 |

(Continued)

OTHER PUBLICATIONS

3 GPP TS 25.211 V6.7.0 http://www.3gpp.org/ftp/Specs/html-info/25-series.htm Dec. 2005.
3 GPP TS 25.427 V6.5.0 http://www.3gpp.org/ftp/Specs/html-info/25-series.htm Dec. 2005.
3 GPP TS 25.214 V6.7.1 http://www.3gpp.org/ftp/Specs/html-info/25-series.htm Dec. 2005
3 GPP TS 25.331 V6.8.0 http://www.3gpp.org/ftp/Specs/html-info/25-series.htm Dec. 2005.
3 GPP TS 25.433 V6.8.0 http://www.3gpp.org/ftp/Specs/html-info/25-series.htm Dec. 2005.
Korean Notice of Preliminary Rejection dated Mar. 28, 2008, from the corresponding Korean Application (with partial translation).

(Continued)

*Primary Examiner* — Matthew Sams
(74) *Attorney, Agent, or Firm* — Katten Muchin Rosenman LLP

(57) ABSTRACT

A power control apparatus performs data telecommunication with a mobile station and receives data quality information transmitted therefrom in a wireless telecommunication system. Then it judges a reception quality of the mobile station by using the received data quality information and changes a target power quality which is set up for the mobile station, followed by notifying the mobile station of the changed target power quality.

7 Claims, 14 Drawing Sheets

(56) References Cited

U.S. PATENT DOCUMENTS

| | | | |
|---|---|---|---|
| 2004/0097240 A1* | 5/2004 | Chen et al. | 455/450 |
| 2004/0106426 A1* | 6/2004 | Koo et al. | 455/522 |
| 2004/0120288 A1* | 6/2004 | Adjakple et al. | 370/333 |
| 2005/0099957 A1* | 5/2005 | Soldani et al. | 370/252 |
| 2006/0003789 A1* | 1/2006 | Murata et al. | 455/522 |
| 2007/0197252 A1* | 8/2007 | Watanabe et al. | 455/522 |

FOREIGN PATENT DOCUMENTS

| | | |
|---|---|---|
| JP | 2004-104669 | 4/2004 |
| JP | 2004-187247 | 7/2004 |
| JP | 2005-521293 | 7/2005 |
| WO | 2004/091114 | 10/2004 |

OTHER PUBLICATIONS

Decision of Rejection dated Dec. 18, 2009, from the corresponding Japanese Application.

Decision of Rejection dated Mar. 11, 2010, from the corresponding Japanese Application.

Chinese Office Action dated Sep. 4, 2009, from the corresponding Chinese Application.

European Search Report dated Oct. 20, 2011, from corresponding European Application No. 06 25 2556.

* cited by examiner

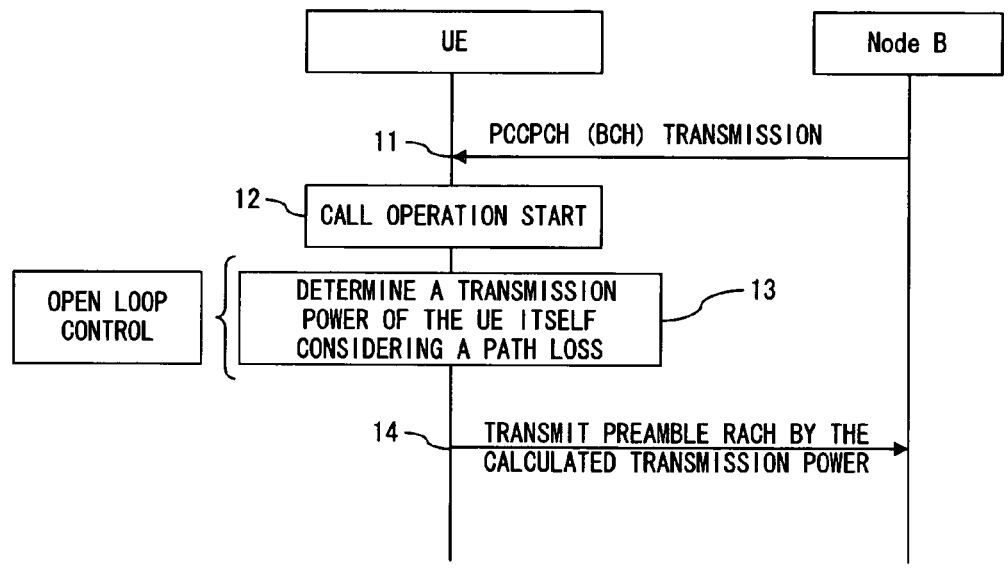
F I G. 1 A

| Information Element/Group name | Need | Multi | Type and reference | Semantics description |
|---|---|---|---|---|
| Primary CPICH Tx Power | MP | | Integer (-10..50) | Power in dBm. |

F I G. 1 B

| Information Element/Group name | Need | Multi | Type and reference | Semantics description |
|---|---|---|---|---|
| Constant value | MP | | Integer (−35..−10) | In dB |

FIG. 1C

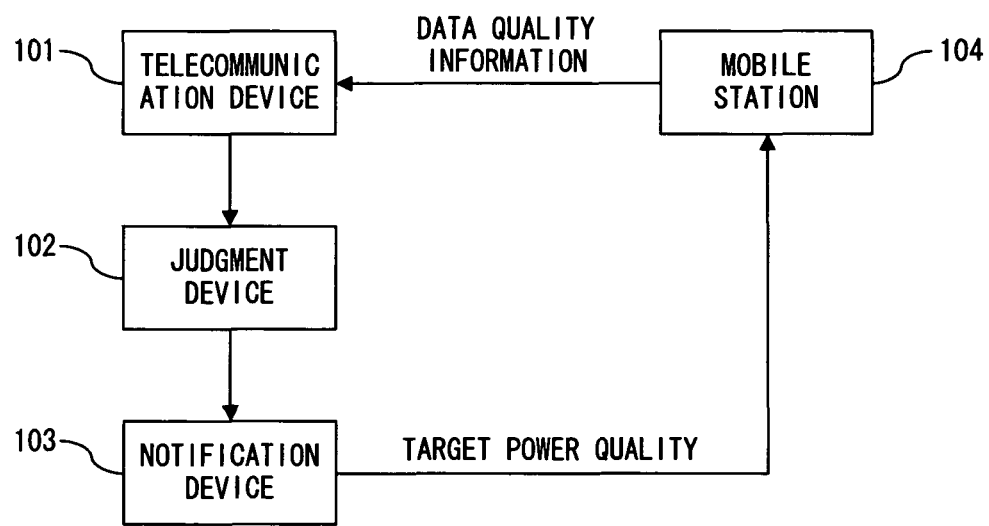
F I G. 2 A

| Information Element /Group name | Need | Type and reference | Semantics description |
|---|---|---|---|
| Message Type | MP | Message Type | |
| UE information elements | | | |
| Integrity check info | CH | Integrity check info 10.3.3.16 | |
| Measurement Information Elements | | | |
| Measurement identity | MP | Measurement identity 10.3.7.48 | |
| Measured Results | OP | Measured Results 10.3.7.44 | |
| Measured Results on RACH | OP | Measured Results on RACH 10.3.7.45 | |
| Additional Measured results | OP | | |
| >Measured Results | MP | Measured Results 10.3.7.44 | |
| Event results | OP | Event results 10.3.7.7 | |
| GSM OTD reference cell | OP | Primary CPICH info 10.3.6.60 | |
| Inter-RAT cell info indication | CV-IRAT | Integer (0..3) | |
| RECEPTION DATA REPORT | OP | | |
| > QUALITY DATA CATEGORY | | 0 :BER[%]<br>1 :BLER[%]<br>2 :CRC[PCS.]<br>.<br>.<br>.<br>255 :etc. | |
| >>QUALITY DATA REPORT VALUE BER | | Integer (0. 0.001..100) | In % |
| >>QUALITY DATA REPORT VALUE BLER | | Integer (0. 0.001..100) | In % |
| >>QUALITY DATA REPORT VALUE CRC | | Integer (0..255) | In PCS. |
| . . . | | | |
| >>QUALITY DATA REPORT VALUE ETC. | | | |

FIG. 5

| Threshold | Need | Type and Reference | Semantics description |
|---|---|---|---|
| JUDGMENT VALUE A | OP | Integer (0. 0.001..100) | In % |
| NUMBER OF TIMES OF JUDGMENTS B | OP | Integer (0..10000) | In Times |
| JUDGMENT PERIOD C | OP | Integer (0. 0.001..100) | In (sec) |
| JUDGMENT PERIOD D | OP | Integer (0. 0.001..100) | In (sec) |
| CURRENT RECEPTION QUALITY E (%) | OP | Integer (0. 0.001..100) | In % |
| PREVIOUS RECEPTION QUALITY F (%) | OP | Integer (0. 0.001..100) | In % |
| JUDGMENT VALUE G (%) | OP | Integer (0. 0.001..100) | In % |
| JUDGMENT VALUE X | OP | Integer (0. 0.001..100) | In |
| JUDGMENT VALUE Y | OP | Integer (0. 0.001..100) | In |
| JUDGMENT VALUE Z | OP | Integer (0. 0.001..100) | In |

F I G. 6

| Parameter | Need | Type and Reference | Semantics description |
|---|---|---|---|
| REPORT CYCLE A (SECONDS) | OP | Integer (0. 0.001.. 100) | In (sec) |
| Trigger | OP | | In |
| > TRIGGER CATEGORY | | 0 : BLER[%]<br>1 : BER[%]<br>2 : CRC[PCS.]<br>. . .<br>255 : etc. | |
| >> TRIGGER CATEGORY BLER | | Integer (0. 0.001..100) | In % |
| >> TRIGGER CATEGORY BER | | Integer (0. 0.001..100) | In % |
| >> TRIGGER CATEGORY CRC | | Integer (0..255) | In |
| . . . | | | |
| >> TRIGGER CATEGORY ETC. | | | |

F I G. 7

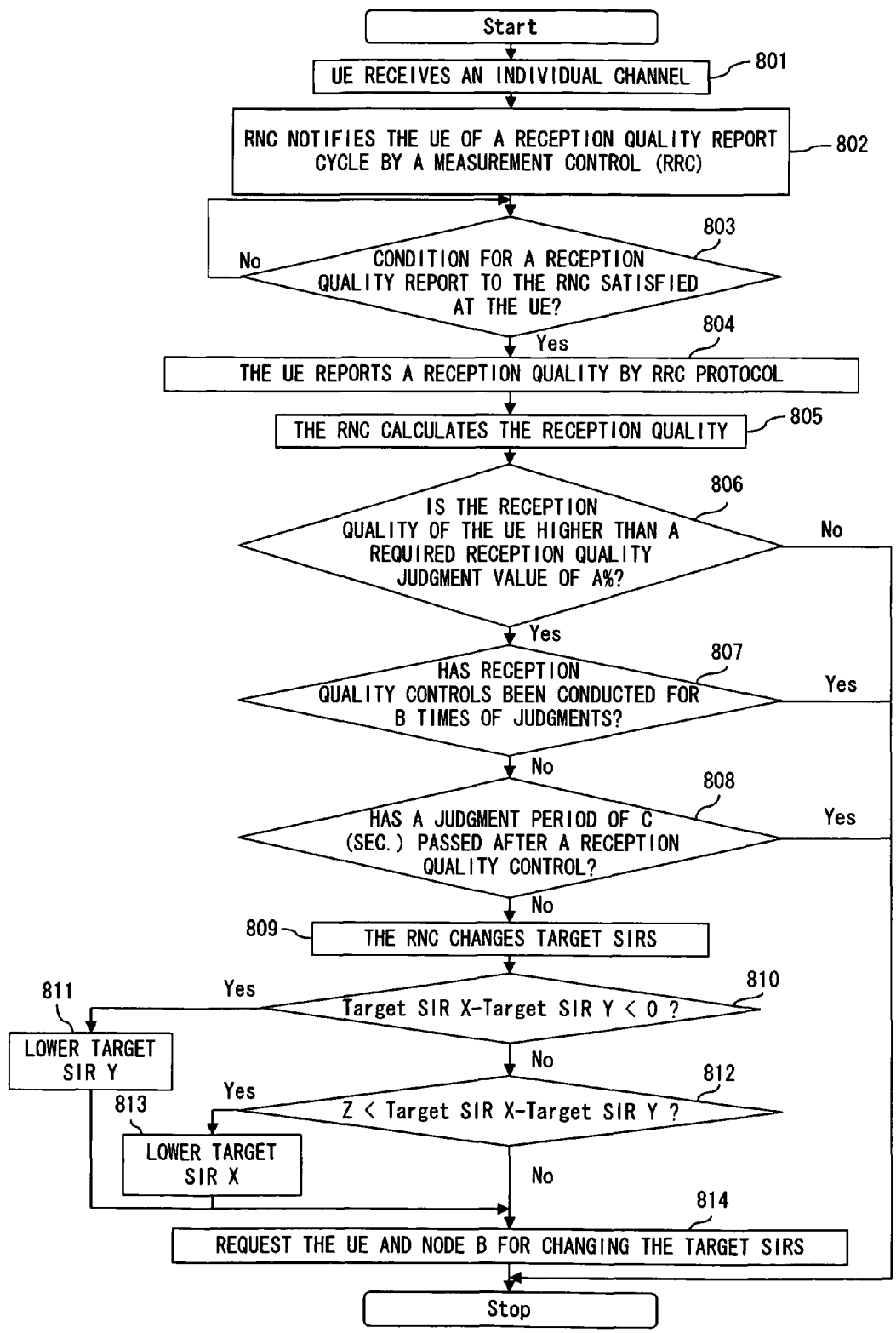
F I G. 8

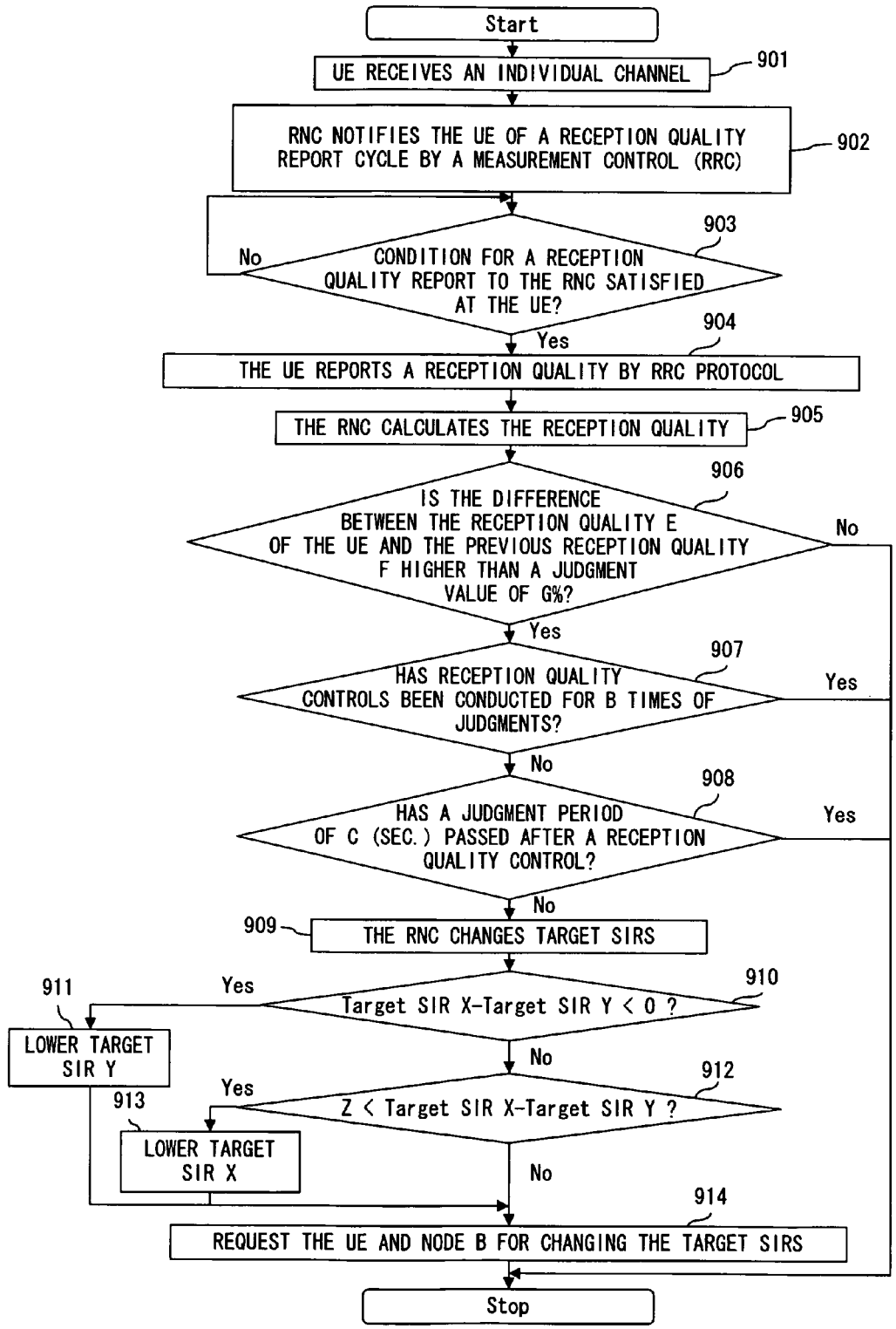
F I G. 9

POWER CONTROL APPARATUS FOR WIRELESS TELECOMMUNICATION SYSTEM

BACKGROUND OF THE INVENTION

1. Field of the Invention

The present invention relates to a power control for a wireless telecommunication system and in particular to an apparatus for performing a power control among a mobile station, a base station apparatus and a base station control apparatus which is carried out in a mobile telecommunication system employing Wideband Code Division Multiple Access (W-CDMA).

2. Description of the Related Art

With respect to a power control method for the W-CDMA system, the 3GPP ($3^{rd}$ Generation Partnership Project) standard specifies as the following paragraphs (1) through (3):

(1) Open Loop Power Control (refer to the below noted non-patent document 1):

Non-Patent document 1: 3GPP TS25.331; [online], [searched on Jan. 6, 2006], Internet <URL: http://www.3gpp.org/ftp/Specs/html-info/25-series.htm>

The Open Loop Power Control is applied to a common channel (Preamble RACH (Random Access Channel)/Preamble CPCH (Control Physical Channel)).

FIG. 1A shows an operation sequence of an initial transmission power control at a mobile station (UE) at the time of transmitting a Preamble RACH. First, a base station apparatus (Node B) performs a PCCPCH (Primary Common Control Physical Channel) transmission or a BCH (Broadcast Channel) transmission to a UE and notifies it of a cell transmission power and a pilot channel power by using a System Information Block (procedure 11).

The UE starts a call operation (procedure 12) and calculates a Path Loss with the base station of a transmission destination by subtracting a power received at the UE itself (i.e., CPICH Ec/Io or RSCP (Received Signal Code Power)) from a cell transmission power (i.e., CPICH (Common Pilot Channel) transmission power) (procedure 13). And it determines a transmission power of the UE itself with the Path Loss being considered and performs a Preamble RACH transmission by the transmission power (procedure 14).

Then a base station control apparatus (Radio Network Controller) receives a report (i.e., Measurement Results on RACH) by RACH and determines the maximum transmission power for a common channel (i.e., FACH (Forward Access Channel)) which is used when transmitting downlink control information, based on a state of the reception power of the UE.

In the case of carrying out an Open Loop Power Control, "Primary CPICH Tx power" and "Constant value" within a System Information Block are used. The Primary CPICH Tx power and Constant value are defined as shown by FIGS. 1B and 1C.

A Preamble RACH transmission power (Preamble Initial Power) transmitted from the UE is provided by the following expression (1):

$$\text{Preamble\_Initial Power} = (\text{Primary CPICH } Tx \text{ power}) - (\text{CPICH\_RSCP}) + (UL \text{ interference}) + (\text{Constant Value}) \quad (1)$$

(2) Inner Loop Power Control (refer to the below noted non-patent documents 2 and 3):

Non-patent document 2: 3GPP TS25.211; [online], [searched on Jan. 6, 2006], Internet <URL: http://www.3gpp.org/ftp/Specs/html-info/25-series.htm>

Non-patent document 3: 3GPP TS25.214; [online], [searched on Jan. 6, 2006], Internet <URL: http://www.3gpp.org/ftp/Specs/html-info/25-series.htm>

The Inner Loop Power Control is a power control for an L1 line (a physical channel: DPCH (Dedicated Physical Channel), which operates independently in a DL (downlink) and a UL (uplink). It basically is operable in a single slot synchronism.

A Target SIR, that is, a target value of a Signal to Interference Ratio is retained by the Node B and UE respectively, and whose target value is basically changeable for each RAB (Radio Access Bearer) category. The target value is defined by station data at the RNC and set up at the time of a call establishment. And the Target SIR is controllable and/or updateable by a later described Outer Loop Power Control.

In the Inner Loop Power Control, an increase or decrease of a transmission power is specified by a transmission power control (TPC) bit so that an SIR comes close to the Target SIR between corresponding apparatuses (i.e., the node B and UE) A TPC bit, however, is capable of specifying only an increase or decrease. A control range, et cetera, of the TPC is specified at the time of a call establishment by using a RRC (Radio Resource Control) message.

(3) Outer Loop Power Control (refer to the below noted non-patent documents 4 and 5):

Non-patent document 4: 3GPP TS25.427; [online], [searched on Jan. 6, 2006], Internet <URL: http://www.3gpp.org/ftp/Specs/html-info/25-series.htm>

Non-patent document 5: 3GPP TS25.433; [online], [searched on Jan. 6, 2006], Internet <URL: http://www.3gpp.org/ftp/Specs/html-info/25-series.htm>

In the Outer Loop Power Control, a Target SIR is changed so that a line reception quality (BLER (Block Error Rate)/BER (Bit Error Rate)) comes close to a required reception quality. In this case, a control is carried out by measuring the respective line qualities of the UL and DL at the RNC and UE, respectively.

A reception quality is not always proportion ate with a reception SIR value, and the former is sometimes bad even if the latter is good. Accordingly, a line quality is measured by means of the Outer Loop Power Control and the Target SIRs are changed so as to come close to the required reception quality.

The UE observes a quality (i.e., BLER/BER) after synthesizing the maximum ratio and periodically changes Target SIRs of the Outer Loop Power Control. The change cycle is settable for each RAB.

The RNC observes a quality (i.e., CRC (Cyclic Redundancy Check)/BLER/BER) after applying a selective combined diversity process to a reception signal and periodically changes the Target SIRs of the Outer Loop Power Control. Since the control is carried out by an SRNC (Serving Radio Network Controller), it is settable in both of the frame protocol of Iur/Iub frames.

FIG. 1D shows an operation sequence of the above described Inner Loop Power Control and Outer Loop Power Control.

As a call is established among the UE, Node B and RNC (procedure 21), an individual channel signal is transmitted and received between the Node B and UE (procedure 22). The respective apparatuses of the UE and Node B measure SIRs respectively and compare the measured SIRs with the Target SIR (procedures 23 and 24).

Then, each apparatus instructs the opposite apparatus for an increase or decrease of the transmission power by using a TPC bit so that the SIR comes close to the Target SIR (procedure 25) and the opposite apparatus changes the transmission powers compliant to the instruction, followed by transmitting data (procedure 26).

The Node B calculates CRC of the data received from the UE and calculates a Transport CH BER (procedure 27), followed by reporting the obtained CRC/BER to the RNC (procedure 28).

The RNC calculates the reception quality from the received CRC by the following expression and changes the Target SIRs so that the reception quality comes close to the required reception quality (procedure 29):

Reception quality=(the number of unacceptable CRC results within a predetermined period)/(the number of samples within the predetermined period) (2)

Then it notifies the Node B of a change instruction (procedure 30).

The Node B changes the Target SIRs according to the instruction (procedure 31), and carries out an Inner Loop Power Control between the Node B and UE once again based on the changed Target SIR for changing the transmission powers (procedures 32 and 33).

The below noted patent document 1 relates to a power control between a UE and a Node B. In this system, the UE measures TFCI (Transport Format Combination Indicator) and calculates an appropriate value, thereby notifying the Node B of a TFCI field power offset and carrying out a power control.

Patent document 1: Japanese Patent Application Publication No. 2002-198903

In the conventional power control, an independent power control is carried out between the UE and Node B or between the Node B and RNC as described above. In this case, a power control is not carried out between the UE and RNC where direct telecommunication takes place, although the power is appropriately set for each section, and therefore the powers for both sections cannot be set to appropriate values simultaneously.

SUMMARY OF THE INVENTION

An object of the present invention is to carry out a power control between a UE and an RNC for a wireless mobile telecommunication system.

A power control apparatus according to the present invention, comprising a telecommunication device, a judgment device and a notification device, controls a power of a mobile station for use in a wireless mobile telecommunication system.

The telecommunication device receives data quality information transmitted from the mobile station. The judgment device judges a reception quality of the mobile station by using the received data quality information and changes a target power quality which is set up for the mobile station based on a result of the judgment. The notification device notifies the mobile station of the changed target power quality.

BRIEF DESCRIPTION OF THE DRAWINGS

FIG. 1A shows a conventional Open Loop Power Control;
FIG. 1B shows the definition of Primary CPICH Tx power;
FIG. 1C shows the definition of Constant value;
FIG. 2A is a diagram showing the principle of a power control apparatus according to the present invention;
FIG. 5 shows a Measurement Report;
FIG. 6 shows judgment parameters;
FIG. 7 shows a Measurement Control;
FIG. 8 is a flow chart of a first quality judgment process;
FIG. 9 is a flowchart of a second quality judgment process.

DESCRIPTION OF THE PREFERRED EMBODIMENTS

Figure 1D:
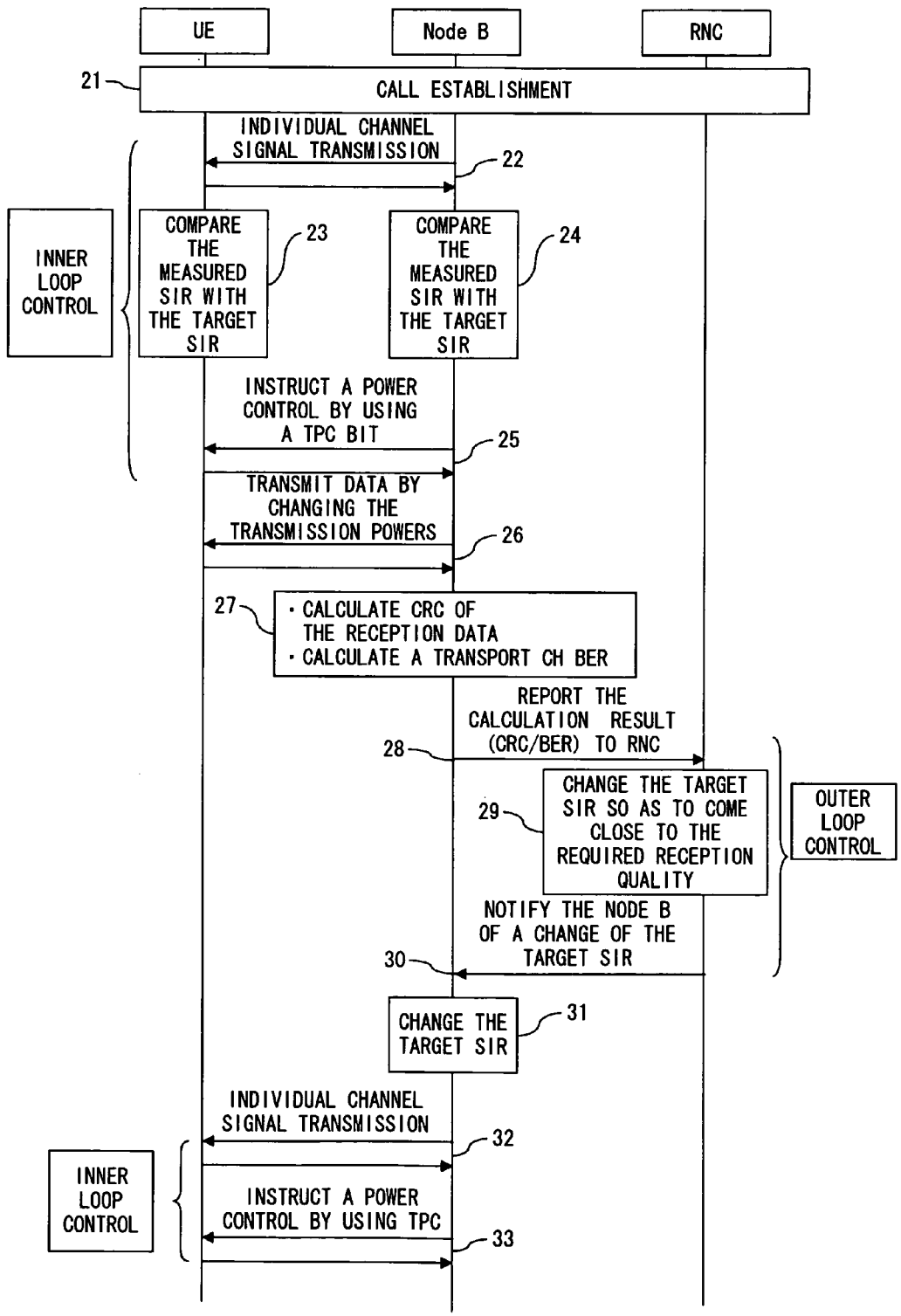
FIG. 1D shows a conventional Inner Loop Power Control/Outer Loop Power Control.

The following is a detailed description of the preferred embodiment of the present invention by referring to the accompanying drawings.

FIG. 2A is a diagram showing the principle of a power control apparatus according to the present invention. The power control apparatus shown by FIG. 2A, comprising a telecommunication device 101, a judgment device 102 and a notification device 103, controls a power of a mobile station 104 for use in a wireless mobile telecommunication system.

The telecommunication device 101 receives data quality information transmitted from the mobile station 104. The judgment device 102 judges a reception quality of the mobile station 104 by using the received data quality information and changes a target power quality which is set up for the mobile station 104 based on a result of the judgment. The notification device 103 notifies the mobile station 104 of the changed target power quality.

The mobile station 104 generates data quality information indicating a quality of the received data and transmits it to the telecommunication device 101 which then transfers the received data quality information to the judgment device 102. The judgment device 102 judges whether or not a reception quality of the mobile station 104 is within a predetermined range by using the data quality information and, if it is not within the predetermined range, changes a target power quality of the mobile station 104. The notification device 103 notifies the mobile station 104 of the changed target power quality, and the mobile station 104 changes the powers so as to accomplish the notified target power quality.

The power control apparatus corresponds to a later described RNC shown in FIG. 2B, and the mobile station 104 corresponds for example to a UE shown in FIG. 2B. The telecommunication device 101 and notification device 103 for example correspond to a later described interface unit 302 shown in FIG. 3, while the judgment device 102 corresponds for example to a quality judgment unit 383 shown in FIG. 3.

According to the present invention, the UE reports data quality information indicating a reception power state to the RNC, thereby enabling the RNC to directly control the power of not only the Node B but also the UE. Therefore, this enables a power control between the UE and RNC aiming at a convenience of the entire system, and accordingly an integrated control of a required transmission power/reception power for the UE and Node B.

The present embodiment is configured to carry out a power control by the UE directly handing over a power control-use parameter to the RNC. The UE reports a quality of reception data by using a message of an RRC protocol such as Measurement Report directly to the RNC. The RNC then calculates the difference between the quality information received from the UE and a required reception quality and notifies the Node B and UE respectively of a change of a Target SIR, thereby carrying out a power control directly.

Figure 2B:
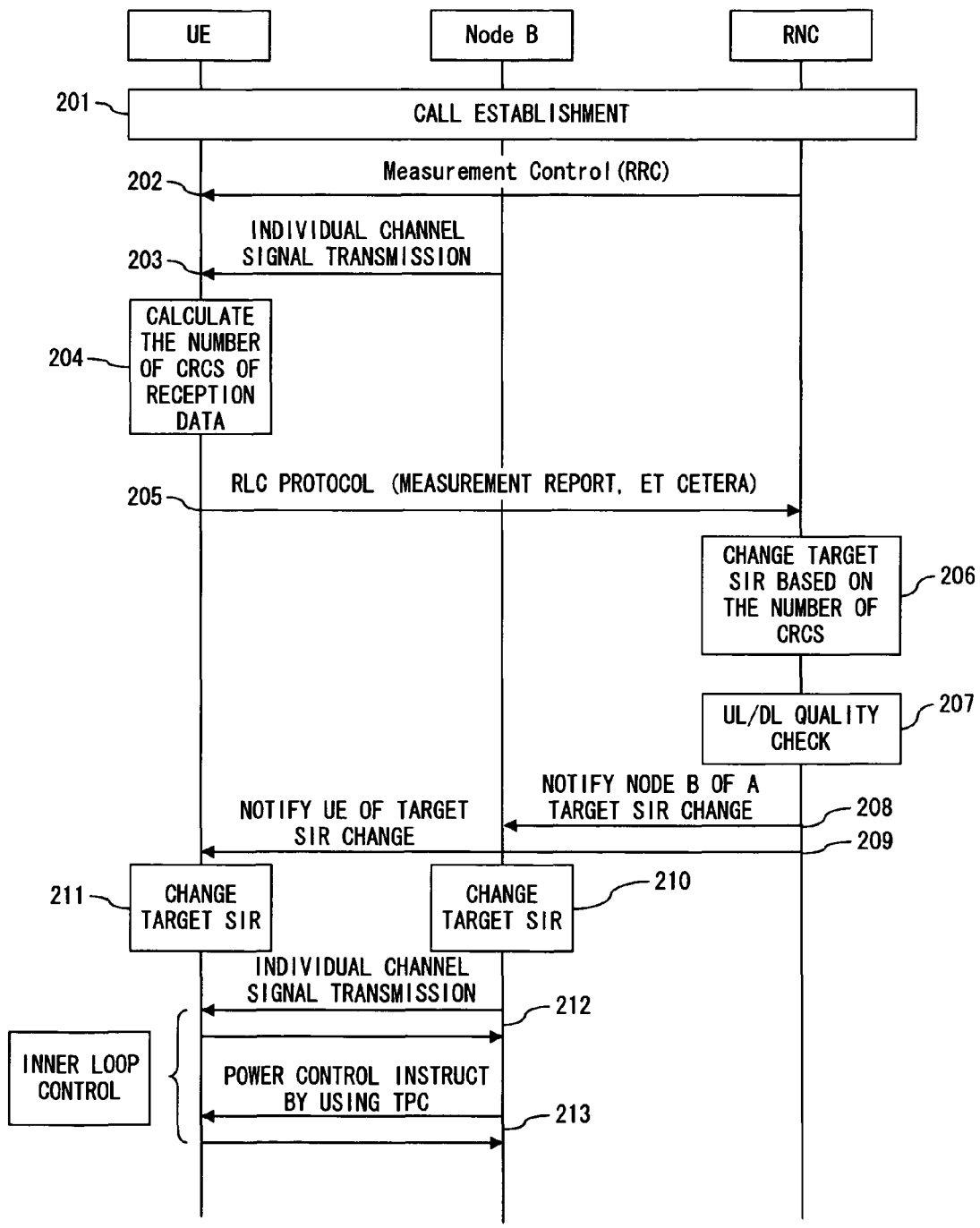
FIG. 2B shows a power control according to the present invention.

FIG. 2B shows an operation sequence of such a power control. First, a call is established between the UE and RNC (procedure 201), followed by the RNC instructing a report timing of a reception data quality of the UE (e.g., CRC, BLER or BER) by using Measurement Control that is a message of an RRC protocol (procedure 202).

The telecommunications takes place between the Node B and UE, and an individual channel signal is transmitted and received (procedure 203). The individual signal may be transmitted and received prior to the procedure 202.

The UE calculates CRC, BLER, BER, et cetera, of the reception data from the individual channel signal (procedure 204) and reports a result of the calculation to the RNC at the instructed timing by using a message such as Measurement Report (procedure 205).

The message includes the number of CRCs, the BLER or BER for example. The number of CRCs includes the number of unacceptable CRCs within a predefined period and the number of reception CRCs within a predefined period, with the number of unacceptable CRCs showing the number of errors (i.e., reception data being no good) resulting from the CRC check.

The RNC calculates a reception quality of the UE based on the reported calculation result (procedure 206), followed by comparing the reception quality with a required reception quality and, if there is a difference between the aforementioned two, changing the Target SIR for the UE.

Then it sets a Target SIR for the Node B by an Outer Loop Power Control and checks the Target SIR for the UE and that for the Node B (procedure 207), followed by notifying the Node B of the Target SIR therefor (procedure 208) and notifying the UE of the Target SIR therefor (procedure 209).

Each of the Node B and UE changes the Target SIRs for itself to the value notified from the RNC (procedures 210 and 211), followed by performing an Inner Loop Power Control between the Node B and UE based on the changed Target SIRs and changing the transmission powers (procedures 212 and 213).

However, if an improvement of a reception quality is not recognized despite that the RNC has issued power control instructions continuously for a predetermined number of times, the UE is regarded as a failure device and a power control thereafter is not carried out.

According to such a power control, use of an RRC protocol makes it possible to directly transmit a parameter, which is detectable by the RNC, relating to a reception power state of the UE therefrom to the RNC. And the RNC directly notifying the UE and Node B of a power state enables a power control aiming at a convenience of the entire system and an integrated control of a required transmission power/reception power of the UE and Node B.

Figure 3:
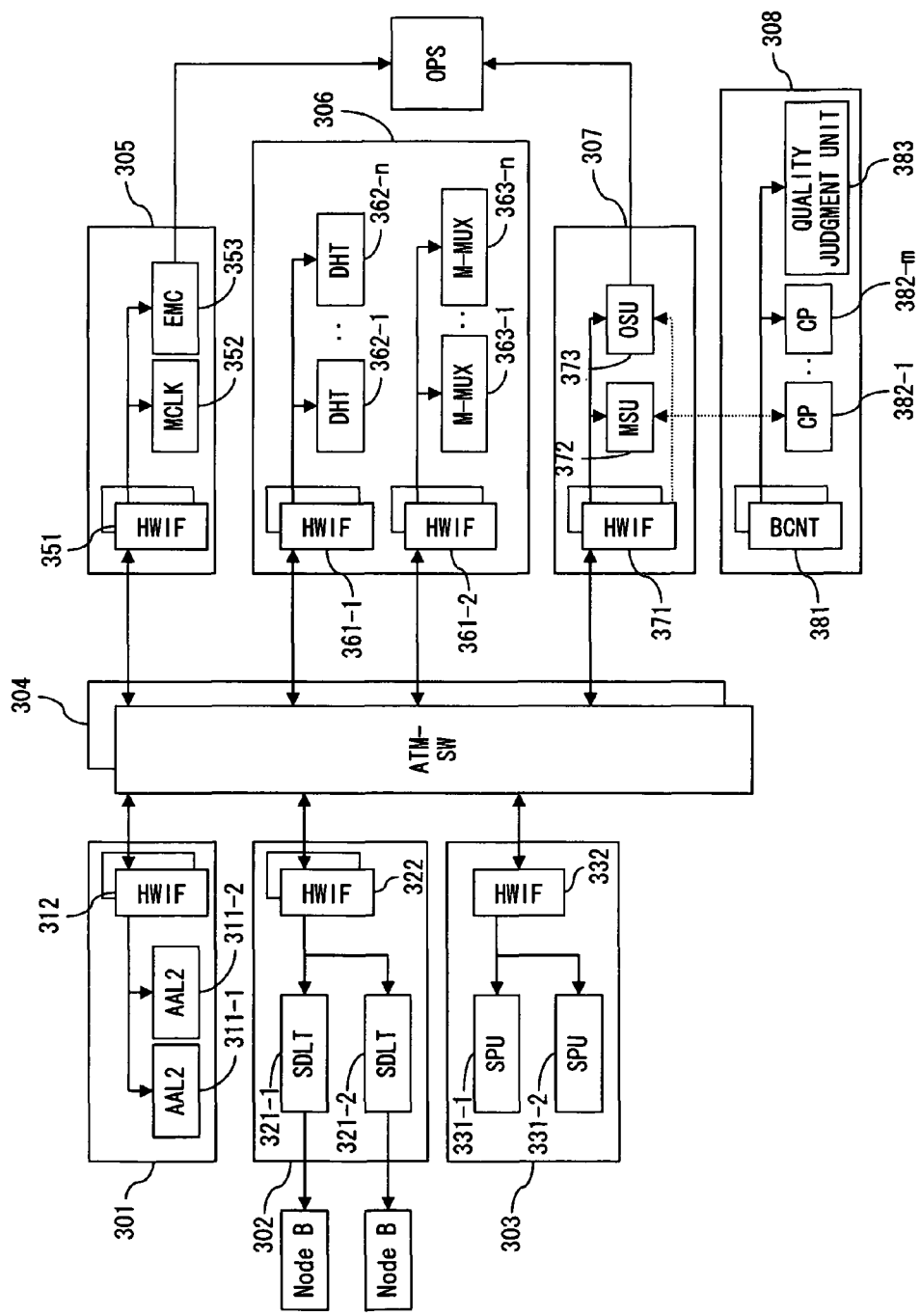
FIG. 3 is a configuration diagram of a base station control apparatus.

FIG. 3 exemplifies a configuration of the RNC shown in FIG. 2B. The RNC, comprising process units 301, 303 and 306, an interface unit 302, a switch unit 304 (ATM-SW), control units 305 and 308, and a termination unit 307, controls a plurality of Node Bs.

The process unit 301 includes AAL2 (ATM Adaptation Layer 2) process units 311-1, 311-2, and a transmission path interface unit 312 (HWIF). The AAL2 process units 311-1 and 311-2 perform multiplexing/de-multiplexing processing of the AAL2.

The interface unit 302 includes transmission path interfaces 321-1 (SDLT), 321-2 (SDLT) and 322 (HWIF). The transmission path interfaces 321-1 and 321-2 perform a termination of the Iub line between the Node B and RNC.

The process unit 303 includes packet data process units 331-1 (SPU) and 331-2 (SPU), and a transmission path interface 332 (HWIF). The packet data process units 331-1 and 331-2 process packet data.

The switch unit 304 performs switching for an ATM (Asynchronous Transfer Mode).

The control unit 305 includes a transmission path interface unit 351 (HWIF), a wireless frame clock generation unit 352 (MCLK) and an emergency control unit 353 (EMC). The wireless frame clock generation unit 352 generates an internal apparatus reference clock signal, while the emergency control unit 353 performs a monitor control for an abnormal apparatus state.

The process unit 306 includes transmission path interfaces 361-1 (HWIF) and 361-2 (HWIF), diversity handover trunk units 362-1 (DHT) through 362-$n$ (DHT), and MAC (Media Access Control) multiplexing/de-multiplexing units 363-1 (M-MUX) through 363-$n$ (M-MUX). The diversity handover trunk units 362-1 through 362-$n$ perform diversity handover processing, while the MAC multiplexing/de-multiplexing units 363-1 through 363-$n$ perform MAC layer multiplexing/de-multiplexing processing for a wireless line.

The termination unit 307, comprising a transmission path interface unit 371 (HWIF), a mobile station opposite signal termination unit 372 (MSU) and an OPS (Operation System) opposite signal termination unit 373 (OSU), terminates a control signal of a call processing, et cetera.

The control unit 308 includes a bus control unit 381 (BCONT), call processing control units 382-1 (CP) through 382-$m$ (CP) and a quality judgment unit 383. The call processing control units 382-1 through 382-$m$ perform a call establishment control, a mobility management, et cetera.

The quality judgment unit 383 compares a reception quality of the UE with a required reception quality based on quality information received therefrom. Here, if the reception quality is inferior, it instructs the UE and Node B to raise Target SIRs so as to improve the reception quality. Meanwhile, if the reception quality is better than the required reception quality, it instructs the UE and Node B to lower the Target SIRs so as to reduce the power consumptions.

The function of the quality judgment unit 383 can be implemented either by software or hardware. In the case of implementing by software, the quality judgment unit 383 includes a CPU (Central Processing Unit) and a memory, and executes a program, thereby judging a reception quality.

Figure 4:
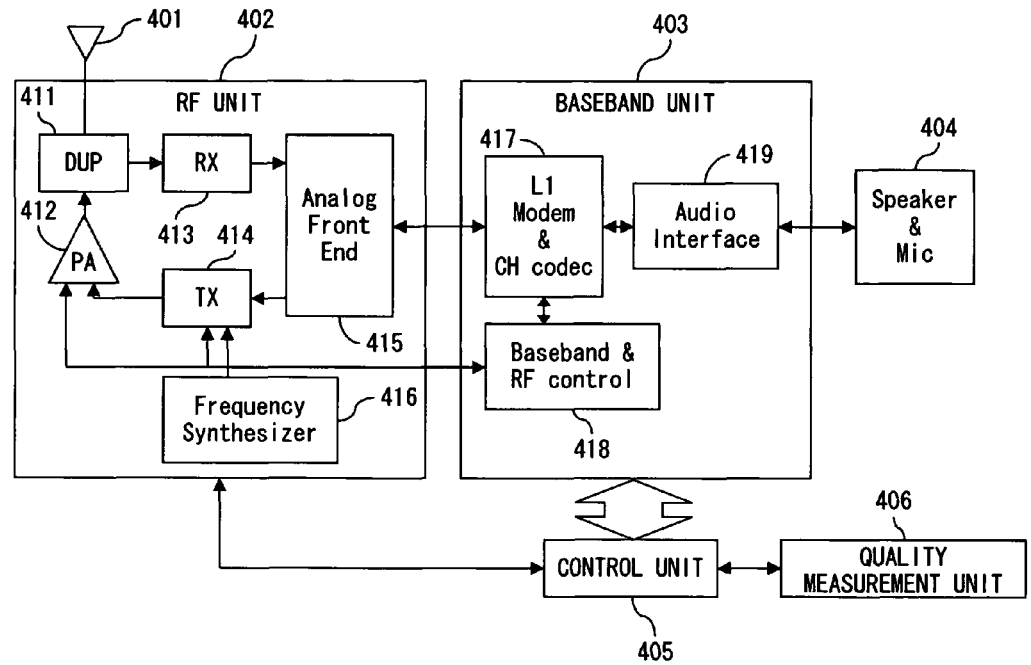
FIG. 4 is a configuration diagram of a mobile station.

FIG. 4 exemplifies a configuration of the UE shown in FIG. 2B. The UE comprises an antenna 401, an RF (Radio Frequency) unit 402, a baseband unit 403, an audio input/output unit 404 (i.e., a speaker and a microphone), a control unit 405 and a quality measurement unit 406.

The RF unit 402 includes a duplexer 411 (DUP), a power amplifier 412 (PA), a receiver 413 (RX), a transmitter 414 (TX), a conversion unit 415 (i.e., Analog Front End) and a frequency synthesizer 416.

The baseband unit 403 includes a signal process unit 417 (L1 Modem & CH codec), a control unit 418 (Baseband & RF control) and an audio interface 419. The audio input/output unit 404 includes a speaker and a microphone.

A signal transmitted from the Node B is received at the antenna 401 and transferred to the baseband unit 403 by way of the duplexer 411, receiver 413 and conversion unit 415. In this event, the receiver 413 detects a reception signal, the conversion unit 415 performs an analog/digital (A/D) conversion, and the baseband unit 403 performs a baseband signal processing such as despreading the reception signal for W-CDMA system, and outputs an audio signal from the audio interface 419 to the audio input/output unit 404.

The audio signal from the audio input/output unit 404 is input to the audio interface 419 and is transferred as a transmission signal by way of the baseband unit 403, conversion unit 415 and transmitter 414. Then, it is amplified by the power amplifier 412, followed by being transmitted to a BTS from the antenna 401 by way of the duplexer 411. In this event, the baseband unit 403 performs a baseband signal processing such as spreading the transmission signal for W-CDMA system, the conversion unit 415 performs a digital/analog (D/A) conversion, and the transmitter 414 performs a conversion into an RF signal by using an output of the frequency synthesizer 416.

The control unit 405 performs RF channel management, quality control, mobility management, et cetera, and also carries out a power control such as setup/change of Target SIRs, change of transmission powers.

The quality measurement unit 406 measures quality data such as CRC, BLER and BER based on the received signal. The measured quality data is transmitted to the RNC by using an RRC protocol.

FIG. 5 exemplifies a Measurement Report used for transmitting quality parameters from the UE to RNC. In this example, a reception data report 501 is added to the conventional Measurement Report. The reception data report 501 includes a quality data category 502 such as BER, BLER and CRC, and respective quality data report values 503 through 505. the reception data report 501 is set as option al (OP).

FIG. 6 shows judgment parameters retained by the quality judgment unit 383 of the RNC and used for a quality judgment process. In this example, parameters A through Z are all set as option al (OP).

The RNC receives quality data (i.e., Physical CH BER and Transport CH BER/BLER) from the Node B, in addition to quality data from the UE. And the quality judgment unit 383 judges respective reception qualities of the UE and Node B. Particularly, in the case of using quality data received from the Node B, it calculates a reception quality in the same logic as the conventional Outer Loop Power Control.

Incidentally, the UE determines timing for reporting quality data to the RNC by a parameter within a Measurement Control received therefrom in advance. Either one of the following is used as a reporting timing:

1. Report in a cycle "a".
2. Compare a BLER measured by the UE with the previous measurement value and report in the case of a larger difference than b (%) existing (i.e., the following expression holds):

$$|(previously\ measured\ BLER)-(measured\ BLER)|>b(\%) \quad (3)$$

3. Compare a BER measured by the UE with the previous measurement value and report in the case of a larger difference than d (%) existing (i.e., the following expression holds):

$$|(previously\ measured\ BER)-(measured\ BER)|>d(\%) \quad (4)$$

4. Compare the number of unacceptable CRCs counted by the UE with the previous count and report in the case of a larger difference than c pieces existing (i.e., the following expression holds):

$$|(previously\ counted\ number\ of\ unacceptable\ CRCs)-(counted\ number\ of\ unacceptable\ CRCs)|>c\ (pieces) \quad (5)$$

FIG. 7 exemplifies a Measurement Control for specifying such a reporting timing. In this example, a report cycle 701 and Trigger 702 are set as option al (OP). Of them, the Trigger 702 includes Trigger category 703 such as BLER, BER, CRC, et cetera, and threshold values 704 through 706 of the respective Trigger categories. These threshold values 704 through 706 correspond to the above described b, d and c.

Figure 10:
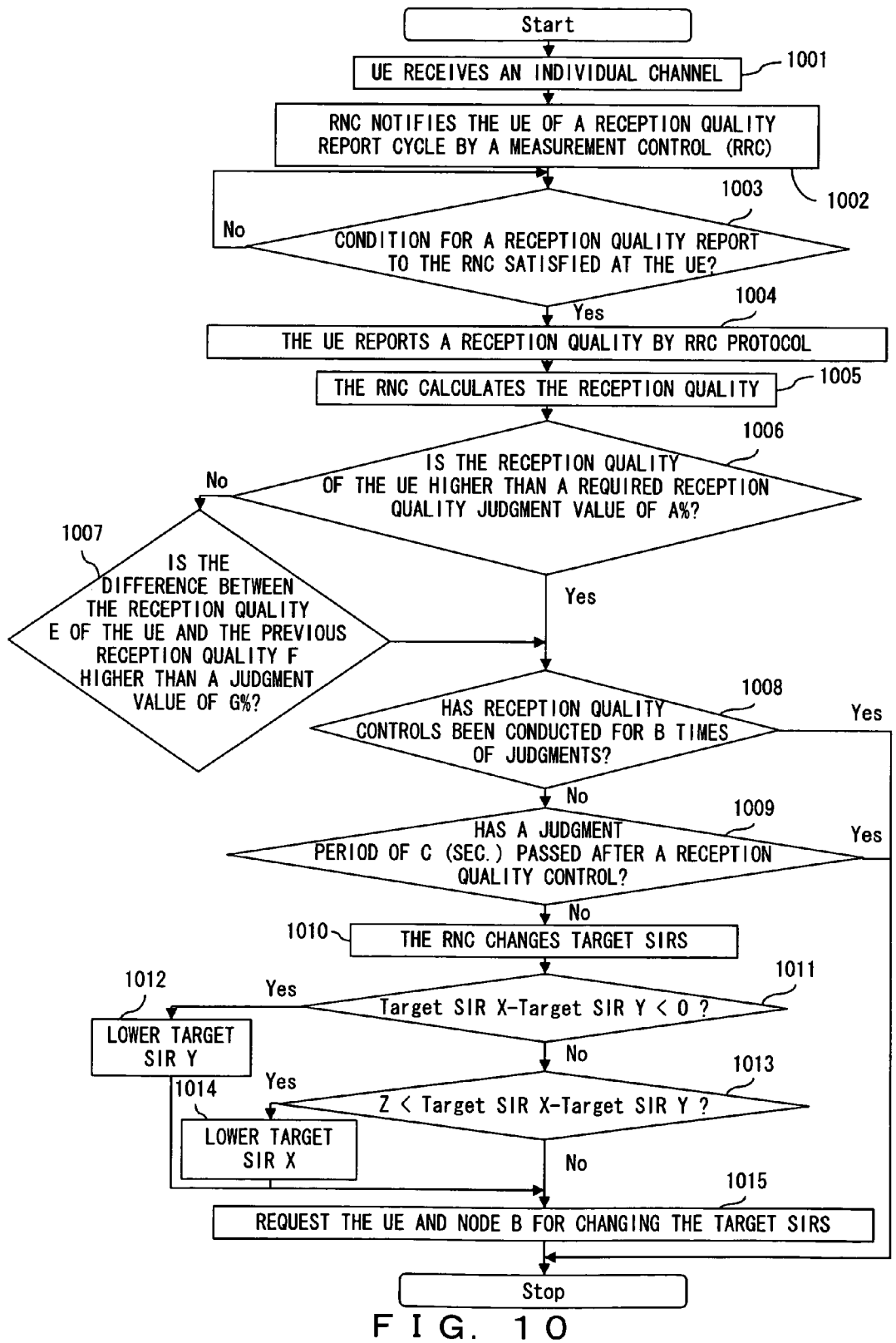
FIG. 10 is a flowchart of a third quality judgment process.

The next descriptions are of three examples of quality judgment processes carried out by the quality judgment unit 383 shown in FIG. 3 by referring to FIGS. 8 through 10. The quality judgment process corresponds to the procedures 202 through 209 shown in FIG. 2B.

FIG. 8 is a flow chart of a quality judgment process for judging a reception quality by reception data (i.e., quality data). In this example, the UE receives an individual channel signal (step 801) followed by the RNC transmitting a Measurement Control to the UE, thereby notifying of a reporting timing of quality data (step 802).

Then the UE checks whether or not the condition of the notified reporting timing is satisfied (step 803) and, if the condition is satisfied, transmits a Measurement Report to the RNC, and reports quality data (step 804).

Then the quality judgment unit 383 of the RNC calculates a reception quality as follows (step 805):

1. In the case of quality data being BLER:

$$Reception\ quality=BLER\ (\%) \quad (6)$$

2. In the case of quality data being the number of CRCs:

$$Reception\ quality=BLER\ (\%)=(the\ number\ of\ unacceptable\ CRCs)*100/the\ number\ of\ received\ CRCs \quad (7)$$

3. In the case of quality data being BER:

$$Reception\ quality=BER\ (\%) \quad (8)$$

Then the quality judgment unit 383 sets a Target SIR based on the reception quality as follows:

1. No change of Target SIR in the case of: 0≤reception quality≤judgment value A
2. Raise Target SIR in the case of: judgment value A<reception quality Therefore, it compares the reception quality with the judgment value A (step 806) and, if the reception quality is equal to or smaller than the judgment value A, terminates the process without changing a Target SIR.

If the reception quality is larger than the judgment value, it checks whether or not change instructions for the Target SIR have been issued to the same UE for a continuous B times of judgments (step 807). If the reception quality has not improved even after issuing change instructions for the Target SIR for a continuous B times, it stops a control for the UE in order to reduce a RRC load, and terminates the process.

Meanwhile, if the number of change instructions for the Target SIR has not reached B, then it checks whether or not a judgment period of C (seconds) has passed since issuing a change instruction for the Target SIR to the UE (step 808). If the reception quality has not improved even if the judgment period of C has passed, it stops a control for the UE in order to reduce an RRC load and terminates the process.

It restarts a control for the UE when a judgment period of D (seconds) or more passes after stopping a control for the UE.

If the judgment period of C has not passed in the step 808, it changes Target SIRs (step 809). In this event, it raises both of Target SIR X for the UE and Target SIR Y for the Node B.

It then compares the Target SIR X for the UE and the Target SIR Y for the Node B, and modifies those values as follows:

1. No change of the Target SIR X or Y in the case of: 0≤Target SIR X-Target SIR Y≤Z
2. Lower the Target SIR Y in the case of: Target SIR X-Target SIR Y<0
3. Lower the Target SIR X in the case of: Z<Target SIR X-Target SIR Y Here, it compares the difference between X and Y (i.e., Target SIR of X-Target SIR of Y) with "0" (zero) (step 810) and, if the difference is smaller than "0", lowers the Target SIR Y (step 811).

If the difference is equal to or greater than "0", it then compares the difference with the judgment value Z (step 812) and, if the difference is greater than Z, lowers the Target SIR X (step 813). And, if the difference is equal to or smaller than Z, it does not change the Target SIR X or the Target SIR Y.

It then notifies the UE and Node B of the changes of the Target SIR X and the Target SIR Y, respectively, thereby requesting for the change of the Target SIRs (step 814).

FIG. 9 is a flow chart of a quality judgment process based on a difference of reception qualities. The processes of the steps 901 through 905 are the same as those of the steps 801 through 805 shown in FIG. 8.

Then, the quality judgment unit 383 calculates the difference of E-F of the reception qualities from the current reception quality E (%) and the previous reception quality F (%) for the same UE, and compares the difference with a judgment value of G (%) (step 906). In this event, if the difference of reception qualities E-F is equal to or smaller than the judgment value of G (%), it judges the reception quality being good and accordingly terminates the process without changing a Target SIR.

Meanwhile, if the difference of reception qualities E-F is greater than the judgment value of G (%), it judges the reception quality being degraded and accordingly carries out the processes of the step 907 and thereafter. The processes of the steps 907 and 908 are the same as those of the steps 807 and 808 shown in FIG. 8. When a judgment period of D (seconds) or more passes after stopping a control for the UE, it restarts a control therefor.

If the judgment period of C has not passed in the step 908, it raises the Target SIR X for the UE and the Target SIR Y for the node B (step 909), followed by carrying out processes of the step 910 and thereafter. The processes of the steps 910 through 914 are the same as those of the steps 810 through 814 shown in FIG. 8.

FIG. 10 is a flow chart of a quality judgment process combining the judgment of FIG. 8 and that of FIG. 9. The processes of the steps 1001 through 1006 are the same as those of the steps 801 through 806 shown in FIG. 8, except that the current reception quality E (%) is compared with a judgment value of A in the step 1006.

If the reception quality E is equal to or less than the judgment value of A in the step 1006, the quality judgment unit 383 calculates the difference of the reception qualities E-F based on the current reception quality E (%) and the previous reception quality F (%) for the same UE, and compares the difference with a judgment value of G (%) (step 1007). In this event, if the difference of the reception qualities E-F is equal to or smaller than the judgment value of G, it judges the reception quality being good and accordingly terminates the process without changing a Target SIR.

Meanwhile, if the difference of the reception qualities E-F is greater than the judgment value of G, it judges the reception quality being degraded and accordingly carries out the processes of the step 1008 and thereafter. The processes of the steps 1008 and 1009 are the same as those of the steps 807 and 808 shown in FIG. 8. When a judgment period of D (seconds) or more passes after stopping a control for the UE, it restarts a control therefore.

If a judgment period of C has not passed in the step 1009, it raises the Target SIR X for the UE and the Target SIR Y for the Node B (step 1010), followed by carrying out the process of the step 1011 and thereafter. The processes of the steps 1011 through 1015 are the same as those of the steps 810 through 814 shown in FIG. 8.

Although the above described quality judgment processes use BLER or BER as a reception quality, another parameter may be calculated based on the quality data reported from the UE and used as a reception quality.

Also, a power control is not necessarily required to use a Target SIR as target value, and it instead may use another parameter indicating a power quality.

What is claimed is:

1. A power control apparatus for controlling a power of a mobile station for use in a wireless mobile telecommunication system, the power control apparatus comprising:
   a telecommunication device to receive data quality information transmitted from the mobile station in a radio resource control layer;
   a judgment device to repeatedly judge a reception quality of the mobile station by using the received data quality information, to change a first target power quality which is compared with a power quality measured in the mobile station and a second target power quality which is compared with a power quality measured in a base station based on a judgment result, and to stop changing the first target power quality and the second target power quality when the reception quality is not improved by previous instructions to change the first target power quality and the second target power quality; and
   a notification device to transmit the changed first target power quality to the mobile station, to request the mobile station to change the first target power quality, to transmit the changed second target power quality to the base station, and to request the base station to change the second target power quality,
   wherein the judgment device calculates a first indicator of the reception quality by using first data quality information presently received from the mobile station, calculates a second indicator of the reception quality by using second data quality information previously received from the mobile station and judges the reception quality by comparing a difference of the calculated first and second indicators with a judgment value.

2. The power control apparatus according to claim 1, wherein
   said telecommunication device receives information indicating a first and a second block error rates as said first and second data quality information, and said judgment device judges said reception quality by using the first and second block error rates as the first and second indicators.

3. The power control apparatus according to claim 1, wherein
   said telecommunication device receives information indicating a first and a second bit error rates as said first and second data quality information, and said judgment device judges said reception quality by using the first and second bit error rates as the first and second indicators.

4. The power control apparatus according to claim 1, wherein
   said telecommunication device receives information indicating a first and a second error counts in cyclic redundancy checks as said first and second data quality information, and said judgment device judges said reception quality by using the first and second error counts as the first and second indicators.

5. The power control apparatus according to claim 1, wherein
said judgment device judges the reception quality by further comparing the calculated first indicator with another judgment value.

6. A power control method for controlling a power of a mobile station for use in a wireless mobile telecommunication system, the power control method comprising:
receiving data quality information transmitted from the mobile station in a radio resource control layer by performing data telecommunication with the mobile station;
repeatedly judging a reception quality of the mobile station by using the received data quality information and changing a first target power quality which is compared with a power quality measured in the mobile station and a second target power quality which is compared with a power quality measured in a base station based on a judgment result;
transmitting the changed first target power quality to the mobile station and requesting the mobile station to change the first target power quality;
transmitting the changed second target power quality to the base station and requesting the base station to change the second target power quality; and
stopping the changing the first target power quality and the second target power quality when the reception quality is not improved by previous instructions to change the first target power quality and the second target power quality,
wherein the judging calculates a first indicator of said reception quality by using first data quality information presently received from the mobile station, calculates a second indicator of the reception quality by using second data quality information previously received from the mobile station and judges the reception quality by comparing a difference of the calculated first and second indicators with a judgment value.

7. A power control apparatus for controlling a power of a mobile station for use in a wireless mobile telecommunication system, the power control apparatus comprising:
telecommunication means for receiving data quality information transmitted from the mobile station in a radio resource control layer;
judgment means for repeatedly judging a reception quality of the mobile station by using the received data quality information and changing a first target power quality which is compared with a power quality measured in the mobile station and a second target power quality which is compared with a power quality measured in a base station based on a judgment result, and for stopping the changing the first target power quality and the second target power quality when the reception quality is not improved by previous instructions to change the first target power quality and the second target power quality; and
notification means for transmitting the changed first target power quality to the mobile station, for requesting the mobile station to change the first target power quality, for transmitting the changed second target power quality to the base station, and for requesting the base station to change the second target power quality,
wherein the judgment means calculates a first indicator of the reception quality by using first data quality information presently received from the mobile station, calculates a second indicator of the reception quality by using second data quality information previously received from the mobile station and judges the reception quality by comparing a difference of the calculated first and second indicators with a judgment value.

* * * * *